(12) United States Patent
Bhowmik et al.

(10) Patent No.: US 12,022,565 B2
(45) Date of Patent: Jun. 25, 2024

(54) METHODS AND SYSTEMS FOR SIM MANAGEMENT ON A DSDA/DSDS DEVICE

(71) Applicant: Samsung Electronics Co., Ltd., Suwon-si (KR)

(72) Inventors: Samiran Bhowmik, Bangalore (IN); Kailash Kumar Jha, Bangalore (IN); Avneesh Tiwari, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 318 days.

(21) Appl. No.: 17/544,267

(22) Filed: Dec. 7, 2021

(65) Prior Publication Data

US 2022/0132299 A1   Apr. 28, 2022

Related U.S. Application Data

(63) Continuation of application No. PCT/KR2021/014722, filed on Oct. 20, 2021.

(30) Foreign Application Priority Data

Oct. 23, 2020   (IN) .............................. 202041046363
Oct. 13, 2021   (IN) .............................. 2020 41046363

(51) Int. Cl.
  *H04W 8/18*      (2009.01)
  *H04W 28/08*     (2023.01)
  *H04W 76/10*     (2018.01)

(52) U.S. Cl.
  CPC ....... *H04W 8/183* (2013.01); *H04W 28/0925* (2020.05); *H04W 28/0992* (2020.05); *H04W 76/10* (2018.02)

(58) Field of Classification Search
  None
  See application file for complete search history.

(56) References Cited

U.S. PATENT DOCUMENTS 11,057,865 B1 *   7/2021   Wong .................. H04W 68/005
2011/0077003 A1   3/2011   Shin
(Continued)

FOREIGN PATENT DOCUMENTS

KR   10-2011-0033499 A   3/2011
KR   10-2020-0143642 A   12/2020
WO   2019/238060 A1     12/2019

OTHER PUBLICATIONS

Ly Thanh Phan, Thales, URSP storage in USIM, C6-190431, Nov. 4, 2019, pp. 3-14.
(Continued)

*Primary Examiner* — Phyllis A Book
(74) *Attorney, Agent, or Firm* — Jefferson IP Law, LLP

(57) ABSTRACT

Methods and systems for SIM management on a DSDA/DSDS device. Methods and systems for Subscriber Identity Module (SIM) management on a User Equipment (UE) are provided. The UE includes one of, a Dual SIM Dual Active (DSDA) UE, or a Dual SIM Dual Standby (DSDS) UE. A method disclosed herein includes selecting a SIM from dual SIM for at least one application to establish at least one Protocol Data Unit (PDU) session. The method includes selecting the SIM for the at least one application based on, at least one of, UE Route Selection Policy (URSP) rules of each SIM, Local Area Data Network (LADN) Data Network Names (DNNs) available per SIM, a current status of each SIM, and an availability of Public Network Integrated Non-Public Network (PNI-NPN) services for each SIM.

20 Claims, 17 Drawing Sheets

(56) References Cited

U.S. PATENT DOCUMENTS

| | | | |
|---|---|---|---|
| 2015/0094071 A1 | 4/2015 | Hang et al. | |
| 2018/0160422 A1 | 6/2018 | Pathak et al. | |
| 2019/0394279 A1 | 12/2019 | Dao et al. | |
| 2020/0267619 A1 | 8/2020 | Huang et al. | |
| 2020/0305118 A1* | 9/2020 | Ryu | H04W 76/16 |
| 2020/0329455 A1* | 10/2020 | Ryu | H04W 28/0865 |
| 2020/0351409 A1* | 11/2020 | Karampatsis | H04W 76/30 |
| 2020/0396591 A1 | 12/2020 | Ou et al. | |
| 2022/0225093 A1* | 7/2022 | Sasi | H04W 12/06 |
| 2023/0180309 A1* | 6/2023 | Zhang | H04W 76/10 370/328 |

OTHER PUBLICATIONS

Huawei et al., KI#1 KI#3, New Sol: N3GPP for MUSIM Service Concurrency, S2-2003975, 3GPP TSG-WG SA2 Meeting #139E e-meeting, Elbonia, May 22, 2020, pp. 1-5 and figure 6.X.3.1-1.

3GPP TR 23.740 V16.0.0, 3GPP; TSGS & SA; Study on Enhancement of Network Slicing (Release 16), Dec. 19, 2018, pp. 28-30 and 37-38.

International Search Report and Written Opinion dated Jan. 20, 2022, issued in International Patent Application No. PCT/KR2021/014722.

3rd Generation Partnership Project; Technical Specification Group Core Network and Terminals; User Equipment (UE) policies for 5G System (5GS); System (5GS); Stage 3 (Release 15), 3GPP TS 24.526, version 15.0.0, Sep. 30, 2018.

Indian Office Action dated Jun. 2, 2022, issued in Indian Patent Application No. 202041046363.

* cited by examiner

FIG. 1B

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |
| Application descriptors | It consists of OSId and OSAppId(s). (NOTE2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. The components of a Route Selection Descriptor are described in table 6.6.2.1-3. | Mandatory | | |

FIG. 1C

| Information name | Description | Category | PCF permitted to modify in a UE context | Scope |
|---|---|---|---|---|
| Rule Selection Descriptor Precedence | Determines the order the URSP rule is enforced in the UE | Mandatory (NOTE 1) | Yes | UE context |
| Route selection components | This part defines the Traffic descriptor components for the URSP rule. | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional (NOTE 8) | Yes | UE context |
| Non-Seamless Offload Indication | Indicates if the traffic of the matching application is to be offloaded to non-3GPP access outside of a PDU Session | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |
| Route Selection Validation Criteria (NOTE 6) | This part defines the Route Validation Criteria components | Optional | | |
| Time Window | The time window when the matching traffic is allowed. The RSD is not considered to be valid if the current time is not in the time window | Optional | Yes | UE context |
| Location Criteria | The UE location where the matching traffic is allowed. The RSD rule is not considered to be valid if the UE location does not match the location criteria. | Optional | Yes | UE context |

METHODS AND SYSTEMS FOR SIM MANAGEMENT ON A DSDA/DSDS DEVICE

CROSS-REFERENCE TO RELATED APPLICATION(S)

This application is a continuation application, claiming priority under § 365(c), of an International application No. PCT/KR2021/014722, filed on Oct. 20, 2021, which is based on and claims the benefit of an Indian provisional application number 202041046363, filed on Oct. 23, 2020, in the Indian Patent Office, and of an Indian Complete patent application number 202041046363, filed on Oct. 13, 2021, in the Indian Patent Office, the disclosure of each of which is incorporated by reference herein in its entirety.

TECHNICAL FIELD

The disclosure relates to the field of dual Subscriber Identity Module (SIM) devices. More particularly, the disclosure relates to performing a SIM management on a dual SIM device to enhance dual SIM experience.

BACKGROUND

Dual Subscriber Identity Module (SIM) devices (for example, Dual SIM Dual Active (DSDA) devices, and a Dual SIM Dual Standby (DSDS) devices) are becoming popular with a $4^{th}$ generation (4G)+$5^{th}$ generation (5G) combination, a 5G+5G combination, or the like.

In a 4G network, all data other than Internet Protocol (IP) Multimedia Subsystem (IMS) may be sent/received over an Internet Packet Data Network (PDN). However, such a solution may not be applicable for the DSDS device supporting a 5G network. In the 5G network, applications may use different Protocol Data Unit (PDU) sessions to connect to a data network, which may not be same as the default Internet PDN. In the DSDS device supporting the 5G network, an application to PDU session mapping is performed through UE Route Selection Policy (URSP) rules, but the URSP rules do not consider the dual SIM scenarios.

Currently, there are few $3^{rd}$ Generation Partnership Project (3GPP) Release 17 work items discussing dual SIM solutions for different problems present in multi SIM devices like paging reception on both SIM, and other similar issues. Once dual SIM solutions are available in the 3GPP Release 17, it may be possible to perform the PDU sessions simultaneously on both the SIMs and receive a paging on both the SIMs at all times with no blackout of any SIM ever. However, the current 3GPP work items do not disclose any mechanisms for selection of the SIM from the dual SIM for the application to perform the PDU session.

FIG. 1A depicts an example method for deciding general priority of a SIM for dual SIM scenarios in order to establish a new PDU session for an application without considering URSP rules of SIMs and other criteria according to the related art. Consider an example scenario, wherein both the SIMs (for example, the SIMs may be Universal Subscriber Identity Modules (USIMs)) of the DSDS device are capable of a 5G network. In such a scenario, the method involves mapping of the multiple applications to only one SIM, according to the related art, based on a user choice, or based on pre-existing methods/algorithms, when the multiple applications are ready to be mapped to the SIMs. Mapping of the multiple applications to only one SIM may lead to poor distribution of PDUs or poor categorization of services, which may lead to bad user experience.

Further, the method does not involve any mechanism to map the applications to the SIMs, according to the related art, based on the URSP rules of the SIMs. FIGS. 1B, and 1C depict URSP rules of a SIM and a UE Route Selection Descriptor (URSD). The URSP rules may be used to determine if data detected from an application may be associated to an established PDU session or a need to trigger an establishment of a new PDU session for the respective application. The URSP rules include a prioritized list of URSP rules (hereinafter referred as prioritized URSP rules) and a default list of URSP rules (hereinafter referred as default URSP rules). Each URSP rule includes a traffic descriptor (comprising one or more components), which determines when the URSP is applicable. The URSP rule is determined to be applicable for the application when every component in the traffic descriptor of the URSP rule matches information/data of the corresponding application. Each URSP rule includes a list of route selection descriptors comprising one or more multiple URSDs, each having a different route selection descriptor precedence value.

Further, the method does not address the following URSP rules related scenarios/cases, according to the related art;
  a case 1: If data of the application (referred hereinafter as app data) matches with the default URSP rule in the URSP rules of both the SIMs, then which SIM has to be selected for the application to establish the PDU session?;
  a case 2: If the app data matches with the prioritized URSP rule of one SIM and the default URSP rule of another SIM, then which SIM has to be selected for the application to establish the PDU session?; and
  a case 3: If the app data matches with the prioritized URSP rules of both the SIMs, then which SIM has to be selected to establish the PDU session?

Consider another example scenario, wherein Local Area Data Network (LADN) Data Network Names (DNNs) have been prioritized in the DSDS device. In such a scenario, each SIM/USIM may have its own URSP rules, and each SIM may obtain LADN information from an Access and Mobility Management Function (AMF) of the network, when the DSDS device connects to the network. The LADN information includes the LADN DNNs and corresponding LADN areas. Since the LADN information depends on subscriptions of the DSDS device, it is possible that one SIM may present outside the LADN area corresponding to the LADN DNN, and another SIM may present in the LADN area/registration area corresponding to the LADN DNN. In an example herein consider that, the application on the DSDS device initiates a request to connect to a LADN DNN 1. In such a scenario, even though a LADN PDU session is possible in one of the SIMs, the application may end up connecting to a normal DNN instead of the LADN DNN 1, if the DSDS device chooses the other SIM (which is not present in the LADN area) for the application for the LADN PDU session. Thus, resulting in serious degradation in the user experience.

Consider another example scenario, wherein in the DSDS device, a priority has to be given to a Multiple Access (MA)-PDU session over a Standalone-PDU session, wherein both the SIMs of the DSDS device support the 5G network and each SIM may have its own URSP rules. Since each SIM is having its own URSP rules, it may be possible that for the same application, the MA-PDU session may be established when the data of the application is evaluated with URSP rules 1 belonging to a SIM 1 or the SA-PDU session may be established when the data of the application is evaluated with URSP rules 2 belonging to a SIM 2.

Further, Access Traffic Steering-Switching-Splitting (ATSSS) enabled PDU sessions may always be prioritized in such cases when the MA-PDU sessions may effectively handle congestion and various other load balancing scenarios depending on a steering method. It may also be possible to achieve higher throughput with the ATSSS enabled PDU sessions. However, when the ATSSS enabled PDU sessions are prioritized over the MA-PDU sessions, the DSDS device does not establish the MA-PDU session even though the MA-PDU session is available on the SIM 1. Thus, resulting in degradation in the user experience.

Consider another example scenario, wherein Public Network Integrated Non-Public Network (PNI-NPN) services have to be prioritized in the DSDS device, wherein both the SIMs of the DSDS device support the 5G network. In the 5G network, a NPN may be used to provide specialized services to a user for certain applications. To deploy the NPN, Closed Access Group (CAG) cells may be used which restricts a mobility of the DSDS device, which has not be allowed to access the CAG cells by camping on the CAG cells due to its subscription. To connect to the NPN, the DSDS device has to be provided with pre-configured DNNs or slices, which may be used to connect to the NPN in order to obtain differential services for some applications. Such DNNs or slices may be configured in the URSP rules of the SIM as highest priority over and above the other DNNs or slices for the same application. Thus, if one SIM is within a coverage of the CAG cell and other SIM is in non-CAG area, priority has to determined accordingly to map the data of the applications to the SIM which is in the CAG area. However, the method does not involve any mechanism to determine the priority to map the data of the applications to the SIM that is in the CAG area, when one SIM is within the coverage of the CAG cell and other SIM is in the non-CAG area according to the related art.

Consider another example scenario, wherein outgoing services of the DSDS device have to be switched if one SIM/USIM stuck in a restricted service area/non-allowed tracking area. In such a scenario, all the outgoing services other than emergency services may be blocked for the SIM that stuck in the restricted service area. Sometimes, the other SIM may still be camped normally in an allowed tracking area and having normal service. However, in such a scenario, the method does not involve any mechanism to switch the PDU sessions from one SIM to another, according to the related art, which is present in the allowed service area. Thereby, leading to service interruptions, which may further lead to poor user experience. Further, when one SIM enters to the restricted service area/No service area, the DSDS device has to use the available another SIM to map all the data from the applications for which the PDU sessions which were active in the SIM that has been entered to the restricted service area. However, the method does not allow the UE to use the available another SIM to map all the data from the applications for which the PDU sessions which were active in the SIM that has been entered to the restricted service area according to the related art.

The above information is presented as background information only to assist with an understanding of the disclosure. No determination has been made, and no assertion is made, as to whether any of the above might be applicable as prior art with regard to the disclosure.

OBJECTS

Aspects of the disclosure are to address at least the above-mentioned problems and/or disadvantages and to provide at least the advantages described below. Accordingly, an aspect of the disclosure is to provide methods and systems for Subscriber Identity Module (SIM) management on a User Equipment (UE), wherein the UE is a Dual SIM Dual Standby (DSDS) UE or a Dual SIM Dual Active (DSDA) UE.

Another aspect of the disclosure is to provide methods and systems for identifying a first SIM or a second SIM for at least one application, based on a first UE Route Selection Policy (URSP) and a second URSP associated with the first SIM and the second SIM, respectively.

Another aspect of the disclosure is to provide methods and systems for selecting the identified first SIM or second SIM to establish at least one Protocol Data Unit (PDU) session corresponding to the respective at least one application.

Additional aspects will be set forth in part in the description which follows and, in part, will be apparent from the description, or may be learned by practice of the presented embodiments.

SUMMARY

In accordance with an aspect of the disclosure, methods and systems for Subscriber Identity Module (SIM) management on a User Equipment (UE) are provided. The UE includes one of, a Dual SIM Dual Active (DSDA) UE, and a Dual SIM Dual Standby (DSDS) UE. The method includes identifying, by the UE, data triggered by at least one application to establish at least one Protocol Data Unit (PDU) session. The method includes identifying, by the UE, a first SIM or a second SIM for the at least one application to establish the at least one PDU session based on a first UE Route Selection Policy (URSP) and a second URSP associated with the first SIM and the second SIM, respectively. The method includes selecting, by the UE, the identified first SIM or second SIM to establish the at least one PDU session corresponding to the respective at least one application.

In accordance with another aspect of the disclosure, a User Equipment (UE) for Subscriber Identity Module (SIM) management is provided. The UE includes one of, a Dual SIM Dual Active (DSDA) UE, and a Dual SIM Dual Standby (DSDS) UE. The UE includes a first SIM, and a second SIM, and a processing circuitry coupled to the first SIM and the second SIM. The processing circuitry is configured to identify data triggered by at least one application to establish at least one Protocol Data Unit (PDU) session. The processing circuitry is configured to identify a first SIM or a second SIM for the at least one application to establish the at least one PDU session based on a first UE Route Selection Policy (URSP) and a second URSP associated with the first SIM and the second SIM, respectively. The processing circuitry is configured to select the identified first SIM or second SIM to establish the at least one PDU session corresponding to the respective at least one application.

Other aspects, advantages, and salient features of the disclosure will become apparent to those skilled in the art from the following description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 1B, and 1C depict URSP rules of a SIM and a UE Route Selection Descriptor (URSD) according to various embodiments of the disclosure;

Throughout the drawings, like reference numerals will be understood to refer to like parts, components, and structures.

DETAILED DESCRIPTION

Figure 1A:
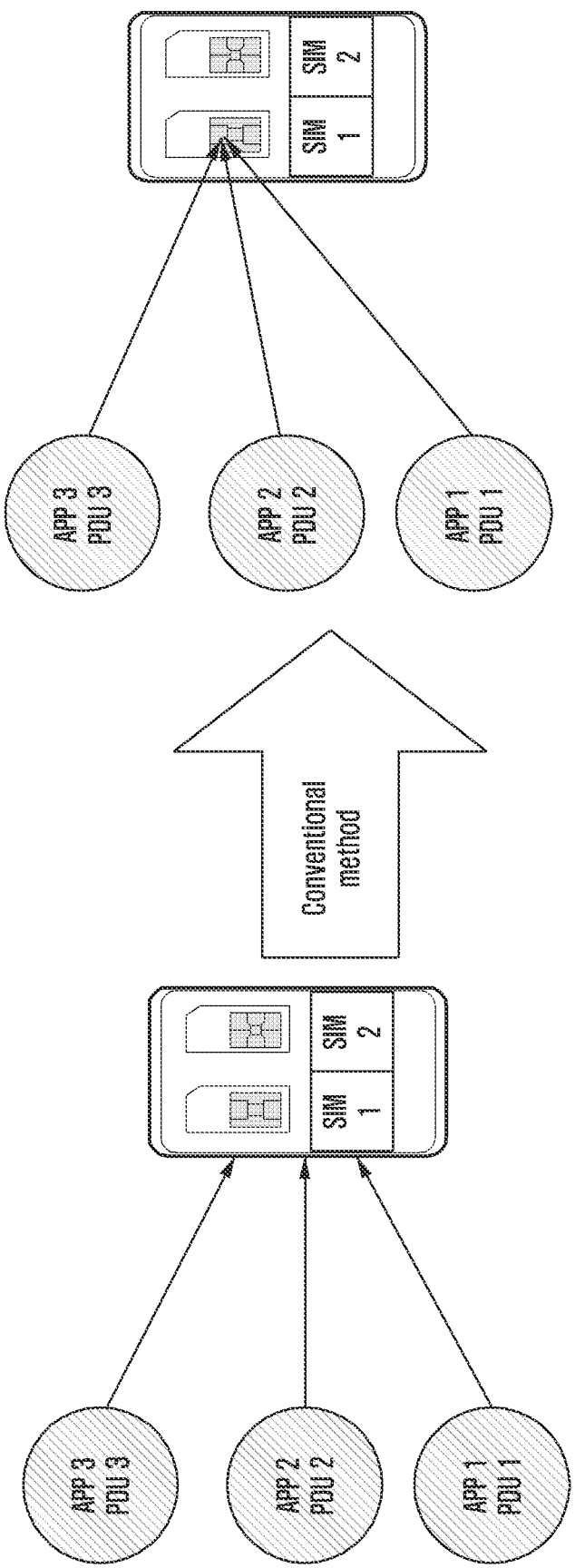
FIG. 1A depicts an example method for deciding general priority of a Subscriber Identity Module (SIM) for dual SIM scenarios in order to establish a new Protocol Data Unit (PDU) session for an application without considering UE Route Selection Policy (URSP) rules of the SIM and other criteria according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications, equivalent, and/or alternative of the various embodiments described herein can be variously made without departing from the spirit and scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments herein perform Subscriber Identity Module (SIM) management on a User Equipment (UE), wherein the UE includes one of, a Dual SIM Dual Active (DSDA) UE, and a Dual SIM Dual Standby (DSDS) UE.

Embodiments herein perform the SIM management on the UE to select a SIM from dual SIM for at least one application to establish at least one Protocol Data Unit (PDU) session.

Embodiments herein perform the SIM management by considering UE Route Selection Policy (URSP) rules of each SIM, Local Area Data Network (LADN) Data Network Names (DNNs) available per SIM, a current status of each SIM, an availability of Public Network Integrated Non-Public Network (PNI-NPN) services for each SIM, or the like, when a user wants to have the best services for the application.

Referring now to the drawings, and more particularly to FIGS. 2 through 9, where similar reference characters denote corresponding features consistently throughout the figures, there are shown example embodiments.

Figure 2:
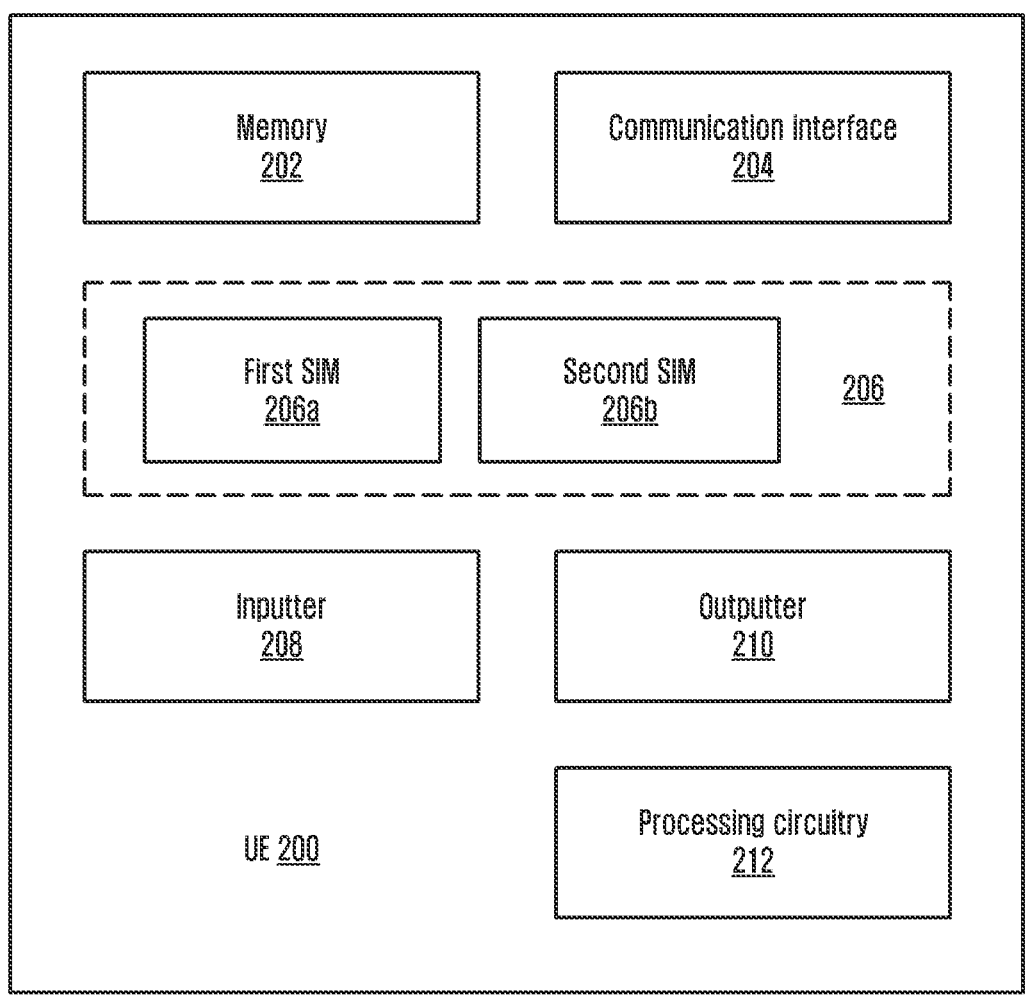
FIG. 2 depicts a User Equipment (UE), according to an embodiment of the disclosure.

FIG. 2 depicts a User Equipment (UE) 200, according to an embodiment of the disclosure. Referring to FIG. 2, an UE 200 referred herein may be a device capable of supporting dual Subscriber Identity Module (SIM). Examples of the UE 200 may be, but are not limited to, a mobile phone, a smartphone, a tablet, a phablet, a personal digital assistant (PDA), a laptop, a computer, a wearable computing device, a vehicle infotainment device, an IoT device, a Wireless Fidelity (Wi-Fi) router, a USB dongle, or any other device capable of supporting the dual SIM.

In an embodiment, the UE 200 may be a Dual SIM Dual Standby (DSDS) UE. In another embodiment, the UE 200 may be a Dual SIM Dual Active (DSDA) UE. As the UE 200 is the DSDS/DSDA UE, the UE 200 may perform multiple Protocol Data Unit (PDU) sessions simultaneously on both the SIMs with negligible/no paging blackout time. The PDU session referred herein may correspond to an end-to-end user plane connectivity between an application on the UE 200 and a specific Data Network (DN). Examples of the DN may be, but are not limited to, the Internet, a Packet Data Network (PDN), an IP Multimedia Core Network Subsystem, and so on. Examples of the PDU sessions may be, but are not limited to, Internet Protocol (IP) Multimedia Subsystem (IMS) PDU session (i.e., to establish IP IMS connectivity between the UE 200 and the DN), a default PDU session, and so on. In an example herein, the PDU session may be referred to a Packet Data Network (PDN) session in a 4G/Long Term Evolution (LTE) network.

The UE 200 may be configured to perform SIM management to select a SIM from the dual SIM for one or more applications to establish one or more Protocol Data Unit (PDU) sessions. In an embodiment, the UE 200 selects the SIM for each application to establish the PDU session by matching data of the application with a UE Route Selection Policy (URSP) of both the SIMs and other criteria. Examples of the other criteria may be, but are not limited to, a Local Area Data Network (LADN) Data Network Name (DNN), prioritization of a Multiple Access (MA)-PDU session over a Standalone (SA)-PDU session, availability of Public Network Integrated Non-Public Network (PNI-NPN) services, and so on.

The URSP may be used to determine to associate the data from the application to an established PDU session or a need to trigger the establishment of a new PDU session for the application. The URSP includes a prioritized list of URSP rules (hereinafter referred as prioritized URSP rules) and a default list of URSP rules (hereinafter referred as default URSP rules). Each URSP rule contains a traffic descriptor (containing one or more components) that determines when the URSP rule is applicable. Each URSP rule (i.e., the prioritized URSP rule or the default URSP rule) includes a list of Route Selection Descriptors containing one or multiple UE Route Selection Descriptors (URSDs) each having a different Route Selection Descriptor Precedence value. The URSP rules may be intuitively inferred by one of ordinary skill in the art by referring to the $3^{rd}$ Generation Partnership Project (3GPP) specification, and thus, detailed description corresponding to the URSP rules is omitted. Embodiments herein use the terms such as "URSP", "URSP rules", "selection policy rules", and so on, interchangeably to refer to policy of the SIM that determines to associate the data of the application with the established PDU session or to trigger the new PDU session for the application.

The LADN DNN referred herein may correspond to the DN available in a LADN service area. The LADN service area may include one or more Tracking Areas (TAs) provided by a Public Land Mobile Network (PLMN) serving the UE 200. The DNN may be used to identify the DN.

The MA-PDU session referred herein may correspond to a PDU session associated with multiple access types. The SA-PDU session referred herein may correspond to a PDU session associated with a single access type.

The PNI-NPN services referred herein may be private services provided by a PNI-NPN within a location/premises such as, but are not limited to, an organization, an enterprise, an industry/factory, a campus, a room, a floor, a hospital, a stadium, an airport, a shopping center, and so on. Examples of the PNI-NPN services may be, but are not limited to, a streaming service (streaming of multimedia data such as audio, video, text and so on), a file download service, a mission-critical service (for example, autonomous driving, control of a smart grid, smart operation of industrial automation processes, or any other service which requires different levels of security), and so on. The PNI-NPN may be deployed in conjunction with the PLMN using a network slicing and/or a Closed Access Group (CAG) cell (as specified in 3GPP TS 23.501). The network slicing provides dedicated data network names (DNNs), or one or more network slice instances that can make the PNI-NPN available to the UE 200 via the PLMN.

The UE 200 includes a memory 202, a communication interface 204, a SIM unit 206, an inputter 208, an outputter 210, and a processing circuitry 212. The UE 200 may also connect to a Core Network (CN) through more Base Stations (BSs)/cells (not shown) to establish the PDU session for the one or more applications. The BSs and the CN may support Radio Access Technologies/wireless networks such as, but are not limited to, a 3rd Generation Partnership Project (3GPP), a Long Term Evolution (LTE/4G), an LTE-Advanced (LTE-A), a Fifth Generation (5G) New Radio (NR), a Wireless Local Area Network (WLAN), Code Division Multiple Access (CDMA), Frequency Division Multiple Access (FDMA), Time Division Multiple Access (TDMA), Orthogonal Frequency Division Multiple Access (OFDMA), General packet radio service (GPRS), Enhanced Data rates for GSM Evolution (EDGE), Universal Mobile Telecommunications System (UMTS), Enhanced Voice-Data Optimized (EVDO), High Speed Packet Access (HSPA), HSPA plus (HSPA+), a Wireless Local Area Network (WLAN), Worldwide Interoperability for Microwave Access (WiMAX/IEEE 802.16), Wi-Fi (IEEE 802.11), Evolved-UTRA (E-UTRA), Wi-Fi Direct, or any other next generation network. A user plane functional entity of the CN (for example, a User Plane Function (UPF) of the CN, if the CN is a 5G core network (5GC)) establishes the PDU session between the application on the UE 200 and the DN. Details related to the establishment of the PDU session by the UE 200 for each application may be intuitively inferred by one of ordinary skill in the art by referring to a UE requested PDU session establishment procedure defined in the 3GPP specification 24.501, section 6.4.1, and thus, detailed description corresponding to the PDU session is omitted.

The memory 202 may store at least one of, the one or more applications, the URSP, pre-configured LADN DNNs, and so on. The memory 202 referred herein may include at least one type of storage medium, from among a flash memory type storage medium, a hard disk type storage medium, a multi-media card micro type storage medium, a card type memory (for example, an SD or an XD memory), random-access memory (RAM), static RAM (SRAM), read-only memory (ROM), electrically erasable programmable ROM (EEPROM), programmable ROM (PROM), a magnetic memory, a magnetic disk, or an optical disk. The one or more applications may provide one or more services to a user/UE 200. Examples of the services may be, but are not limited to, a streaming service (streaming of multimedia data such as audio, video, text and so on), a file download service, a carousel service (a service for combining file download service and streaming service), a television (TV) service, an Internet Protocol (IP) Multimedia Subsystem (IMS) service, a non-3rd Generation Partnership Project (non-3GPP) service (for example: firewalling or the like), a short messaging service, a Multimedia Messaging Service (MMS), emergency services, the private services, and so on.

The communication interface 204 may include one or more components which enable the UE 200 to connect to the user plane functional entity of the CN through the BSs/cells using an interface supported by the RAT. Examples of the interface may be at least one of, a wired or wireless fronthaul interface, a wired/non-radio or wireless/radio interface, or any structure supporting communications over a wired or wireless connection.

The SIM unit 206 may include the dual SIM/two SIMs 206a and 206b. Each SIM (206a, 206b) may be configured to store network-specific information, which have been used to authenticate and identify subscribers/UE 200 on the RAT. The network-specific information may include at least one of, but is not limited to, an Integrated Circuit Card Identifier (ICCID), International Mobile Subscriber Identity (IMSI) number, an authentication key associated with the IMSI number, a Local Area Identity (LAI), an operator-specific emergency number, or the like. In an example herein, the SIM (206a, 206b) may include at least one of, but is not limited to, a Universal Integrated Circuit Card (UICC) SIM, a Universal Subscriber Identity Module (USIM) SIM, an eSIM or an Embedded Universal Integrated Circuit Card (eUICC), an embedded SIM, and so on. In an example, the two SIMs/stacks (206a, 206b) may be of the same Mobile Network Operator (MNO) operating the different RATs. In another example, the two SIM/stacks (206a, 206b) may be of the different MNOs operating the same RAT. In another example, the two SIM/stacks (206a, 206b) may be of the different RATs operating the different RATs.

The inputter 208 may be configured to enable the user to interact with the UE 200.

The outputter 210 may be configured to indicate the user about the SIM (206a/206b) selected for each application to establish the PDU session. The outputter 210 may include at least one of, for example, but is not limited to, a sound outputter/voice assistant module, a display, a vibration motor, a User Interface (UI) module, a light emitting device, and so on, to indicate the selected SIM (206a/206b) to the user for each application. The UI module may provide a specialized UI or graphics user interface (GUI), or the like, synchronized to the UE 200, according to the applications.

The processing circuitry 212 referred herein may include at least of, a single processer, a plurality of processors, multiple homogeneous or heterogeneous cores, multiple Central Processing Units (CPUs) of different kinds, microcontrollers, special media, and other accelerators. The processing circuitry 212 may be configured to perform the SIM management on the UE 200.

For performing the SIM management, the processing circuitry 212 identifies the data triggered by the one or more applications to establish the respective one or more Protocol Data Unit (PDU) sessions. In an embodiment, the data triggered by the application may correspond to at least one of, but is not limited to, traffic descriptors, application descriptors, IP descriptors, domain descriptors, and so on. The processing circuitry 212 identifies one of, the first SIM 206a, or the second SIM 206b, from the dual SIM for the one or more applications to establish the respective one or more PDU sessions. The processing circuitry 212 selects the identified one of, the first SIM 206a, or the second SIM 206b to establish the one or more PDU sessions corresponding to the respective one or more applications.

For identifying one of, the first SIM 206a or the second SIM 206b from the dual SIM for the application, the processing circuitry 212 matches the data triggered by the application with a first URSP and a second URSP of the first SIM and the second SIM respectively. Embodiments herein use the terms "first URSP", "first URSP rules", and so on, interchangeably to refer to the URSP of the first SIM 206a. Embodiments herein use the terms "second URSP", "second URSP rule", and so on, interchangeably to refer to the URSP of the second SIM 206b. The processing circuitry 212 identifies one of, the first SIM, or the second SIM, for the application based on the matching of the associated data with the first URSP and the second URSP.

In an embodiment, if the data of the application matches with the traffic descriptors of the default URSP rule of both the first URSP and the second URSP, the processing circuitry 212 identifies the first SIM 206a, or the second SIM 206b for the application to establish the PDU session, which has been associated with the URSP that allows the MA-PDU session.

In another embodiment, if the data of the application matches with the traffic descriptors of the default URSP rule of both the first URSP and the second URSP, the processing circuitry 212 checks whether the first SIM 206a or the second SIM 206b is in a non-restricted service area or a restricted service area. The non-restricted service area is an area served by the one or more BSs, in which the UE 200 is allowed to access the services from the applications based on subscriptions. Embodiments herein use the terms "non-restricted service area", "registered service area", "allowed tracking area", and so on, interchangeably to an area in the UE 200 can access the services. The restricted service area is an area served by the one or more BSs, in which the UE 200 is restricted access the services based on the subscriptions. Embodiments herein use the terms "restricted service area", "non-allowed tracking area", "No service area", and so on, interchangeably to an area in the UE 200 cannot access the services. The processing circuitry 212 identifies the first SIM 206a or the second SIM 206b in the non-restricted service area for the application to establish the PDU session.

In an embodiment, if the data of the application matches with the traffic descriptors of the prioritized URSP rule of the first URSP and the traffic descriptions of the default URSP rule of the second URSP, the processing circuitry 212 checks if the first SIM 206a is in the non-restricted service area. If the first SIM 206a is in the non-restricted service area, the processing circuitry 212 identifies the first SIM 206a for the application to establish the PDU session.

In an embodiment, if the data of the application matches with the traffic descriptors of the prioritized URSP rules of both the first URSP and the second URSP and the LADN DNN is prioritized in the UE 200, the processing circuitry 212 identifies the LADN DNN requested by the application. The processing circuitry 212 identifies the LADN DNN requested by the application by matching the application with the pre-configured LADN DNNs stored in the memory 202 to connect. The processing circuitry 212 may receive the pre-configured LADN DNNs from the CN and stores the received pre-configured LADN DNNs. On identifying the LADN DNN requested by the application to connect, the processing circuitry 212 determines the LADN area of the first SIM 206a and the second SIM 206b, based on camped information of the first SIM 206a and the second SIM 206b. The processing circuitry 212 identifies the first SIM 206a, or the second SIM 206b present in the LADN area supporting the requested LADN DNN for the application to establish the PDU session.

In another embodiment, if the data of the application matches with the traffic descriptors of the prioritized URSP rules of both the first URSP and the second URSP and the MA-PDU session is prioritized in the UE 200, the processing circuitry 212 checks if the first SIM 206a or the second SIM 206b supports the MA-PDU session or the SA-PDU session. The processing circuitry 212 identifies the first SIM 206a, or the second SIM 206b supporting the MAP PDU over the SA-PDU for the application to establish the PDU session.

In another embodiment, if the data of the application matches with the traffic descriptors of the prioritized URSP rules of both the first URSP and the second URSP and the PNI-NPN services are prioritized in the UE 200, the processing circuitry 212 determines if one of the DNNs associated with the first SIM 206a and the second SIM 206b supports the PNI-NPN services. The processing circuitry 212 determines if one of the DNNs associated with the first SIM 206a and the second SIM 206b supports the PNI-NPN services, by comparing the DNNs available in a non-Closed Access Group (CAG) cell and the CAG cell. The DNNs available in the CAG cell may be separated based on a location criteria in the URSD. The processing circuitry 212 identifies one of, the first SIM 206a and the second SIM 206b associated with the DNN supporting the PNI-NPN services, for the application to establish the PDU session.

On identifying the first SIM 206a, or the second SIM 206b, for the application, the processing circuitry 212 selects the identified SIM (206a/206b) to establish the PDU session corresponding to the respective application.

The processing circuitry 212 may also be configured to switch the established PDU session from the first SIM 206a to the second SIM 206b or vice-versa.

In an embodiment, the processing circuitry 212 may switch the PDU session from the first SIM 206a to the second SIM 206b, or from the second SIM 206b to the first SIM 206a, based on a status/service area associated with the SIM. The processing circuitry 212 may switch the PDU session from the first SIM 206a to the second SIM 206b, or from the second SIM 206b to the first SIM 206a, when the first SIM 206a or the second SIM 206b enters the restricted service area. The PDU session may include a PDU session other than the IP IMS PDU session, and the default PDU session. The processing circuitry 212 switches back the respective PDU session to the first SIM 206a from the second SIM 206b or to the second SIM 206b from the first SIM 206a, when the first SIM 206a or the second SIM 206b exits from the restricted service area.

Consider an example scenario, wherein the PDU session corresponding to an application A has been established using the first SIM 206a and after some time the first SIM 206a is in the restricted service area due to mobility of the UE 200. In such a scenario, the processing circuitry 212 switches the PDU session from the first SIM 206a to the second SIM 206b, wherein the second SIM 206b has been present in the non-restricted service area. Once the first SIM 206a exits the restricted service area and enters the non-restricted service area, the processing circuitry 212 switches back the PDU session corresponding to the application A from the second SIM 206b to the first SIM 206a.

In an embodiment, the processing circuitry 212 may switch the PDU session from the first SIM 206a to the second SIM 206b, or from the second SIM 206b to the first SIM 206a based on the DNN associated with the first SIM 206a and the second SIM 206b. For example, the processing circuitry 212 switches the PDU session from the first SIM 206a to the second SIM 206b, if the second SIM 206b has been associated with the DNN supporting the PNI-NPN services and the first SIM 206a does not associate with the DNN supporting the PNI-NPN services. Similarly, the processing circuitry 212 switches the PDU session from the second SIM 206b to the first SIM 206a, if the first SIM 206a has been associated with the DNN supporting the PNI-NPN services and the second SIM 206b does not associate with the DNN supporting the PNI-NPN services.

Figure 3:
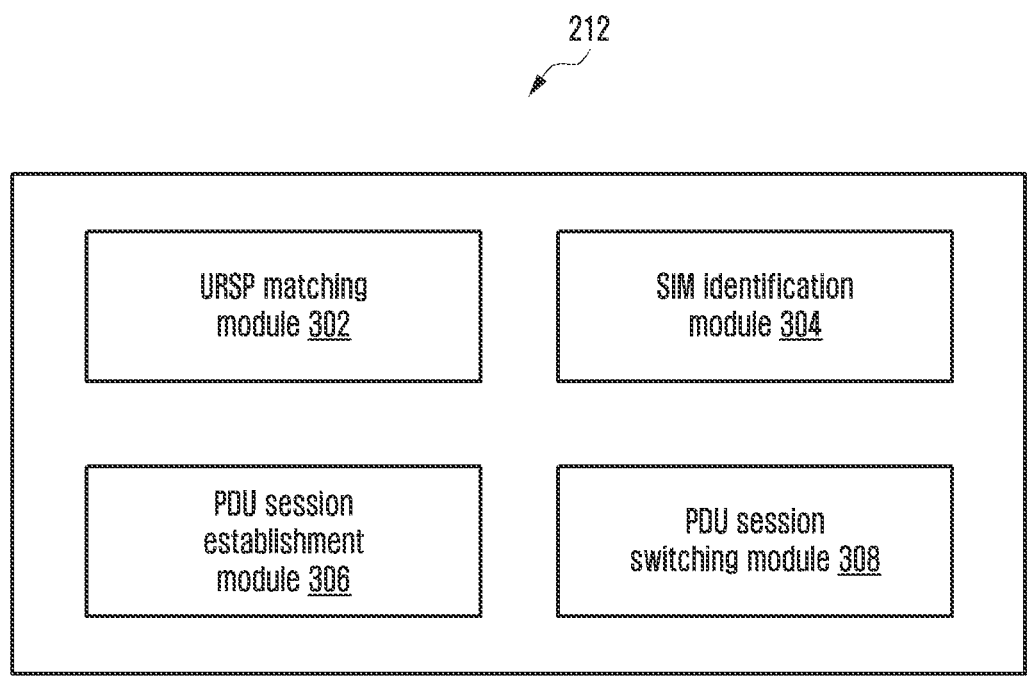
FIG. 3 is an example diagram depicting components of a processing circuitry for performing SIM management on a UE, according to an embodiment of the disclosure.

FIG. 3 is an example diagram depicting components of a processing circuitry for performing SIM management on an UE, according to an embodiment of the disclosure. Referring to FIG. 3, a processing circuitry 212 includes a URSP matching module 302, a SIM identification module 304, a PDU session establishment module 306, and a PDU session switching module 308.

The URSP matching module 302 may be configured to match the data triggered by the application with the first URSP and the second URSP associated with the first SIM 206a and the second SIM 206b, respectively. Matching the data of the application with the first URSP and the second URSP includes matching the data of the application with the traffic descriptors of the prioritized URSP rules and the default rules of both the first URSP and the second URSP. The URSP matching module 302 provides information about the matching of the data of the application with the first URSP and the second URSP to the SIM identification module 304.

The SIM identification module 304 may be configured to identify the first SIM 206a or the second SIM 206b for the application to establish the PDU session, based on the matching of the data of the application with the first URSP and the second URSP. If the data of the application matches with the traffic descriptors of the default URSP rules of both the first URSP, and the second URSP, the SIM identification module 304 identifies:

the first SIM 206a or the second SIM 206b associated with the URSP supporting the MA-PDU session for the application to establish the PDU session; or the first SIM 206a or the second SIM 206b present in the non-restricted service area/registered service area for the application to establish the PDU session.

If the data of the application matches with the traffic descriptors of the prioritized URSP rules of the first URSP and the default URSP rules of the second URSP, the SIM identification module 304 identifies the first SIM 206a for the application to establish the PDU session. The first SIM 206a may be in the non-restricted service area.

If the data of the application matches with the traffic descriptors of the prioritized URSP rules of both the first URSP and the second URSP, the SIM identification module 304 identifies the first SIM 206a or the second SIM 206b for the application to establish the PDU session based on at least one of, the LADN DNN requested by the application to connect, the prioritized MA-PDU session over the SA-PDU session, the availability of the PNI-NPN services, or the like.

If the LADN DNN is prioritized in the UE 200, the SIM identification module 304 identifies the first SIM 206a or the second SIM 206b present in the LADN area supporting the LADN DNN requested by the application to connect for the application to establish the PDU session. If the MA-PDU session is prioritized in the UE 200, the SIM identification module 304 identifies the first SIM 206a or the second SIM 206b supporting the MA-PDU session over the SA-PDU session for the application to establish the PDU session. If the PNI-NPN services are prioritized in the UE 200, the SIM identification module 304 identifies the first SIM 206a or the second SIM 206b present in the CAG area and associated with the DNN supporting the PNI-NPN services for the application to establish the PDU session.

The PDU session establishment module 306 may be configured to use the identified first SIM 206a or second SIM 206b to establish the PDU session for the respective application.

The PDU session switching module 308 may be configured to switch the PDU session from one SIM to another based on at least one of, the presence of the SIM in the restricted service area (i.e., the status of the SIM), the DNN associated with the SIM without supporting the PNI-NPN services, and so on.

FIGS. 2 and 3 show various blocks of an UE, but it is to be understood that other embodiments are not limited thereon. In other embodiments, the UE 200 may include less or more number of blocks. Further, the labels or names of the blocks are used only for illustrative purpose and does not limit the scope of the embodiments herein. One or more blocks can be combined together to perform same or substantially similar function in the UE 200.

FIGS. 4A to 4D are example diagrams depicting identification of a first SIM or a second SIM for an application to establish a PDU session based on a first URSP and a second URSP in dual SIM scenarios, according to various embodiments of the disclosure. When the multiple applications are ready to be mapped, the UE 200 may utilize both the first SIM 206a and the second SIM 206b for better services using the first URSP and the second URSP of the first SIM and the second SIM, respectively, and prioritization of the LADN DNN, the MA-PDU sessions, the PNI-NPN services, and so on, which enhances the user experience.

Figure 4A:
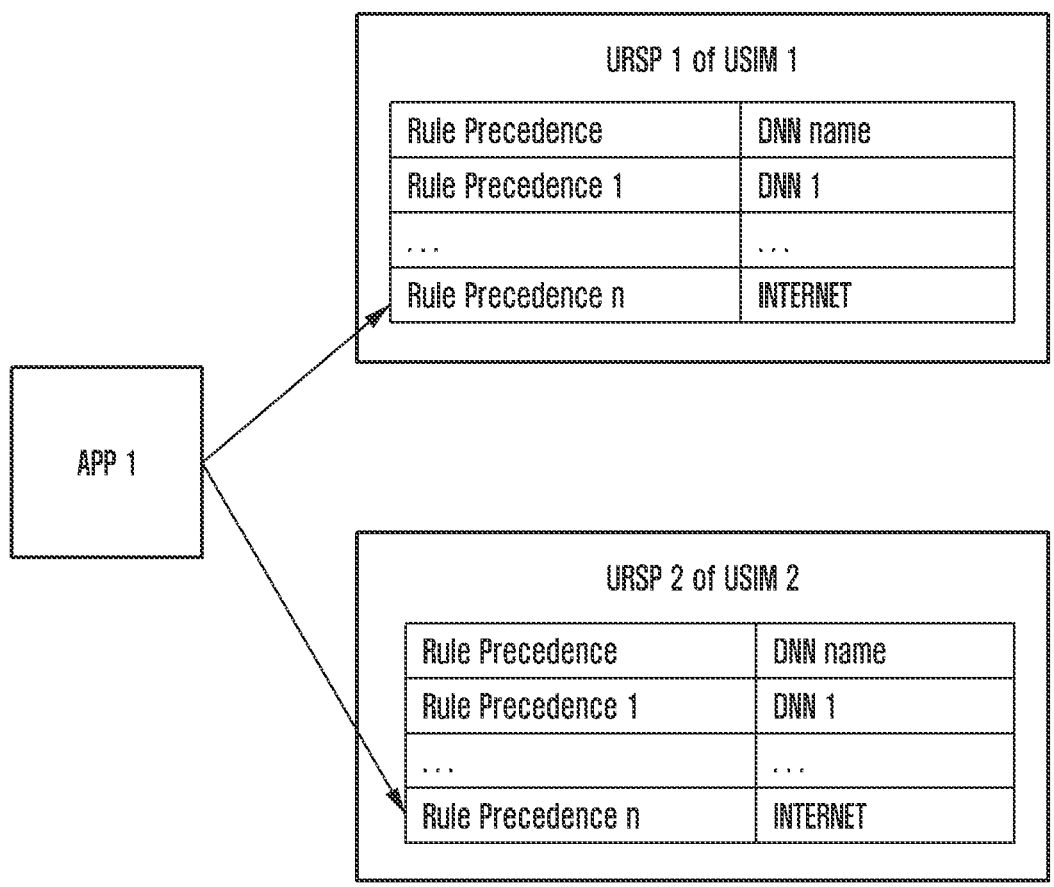
FIGS. 4A, 4B, 4C, and 4D are example diagrams depicting identification of a first SIM or a second SIM for an application to establish a Protocol Data Unit (PDU) session based on a first URSP and a second URSP in dual SIM scenarios, according to various embodiments of the disclosure.

Referring to FIG. 4A, if data of an application matches with default URSP rules (i.e., "Rule Precedence n", as depicted in FIG. 4A) of both a first URSP and a second URSP associated with a first SIM 206a, and a second SIM 206b, respectively, an UE 200 assigns a priority to a first SIM 206a or a second SIM 206b, whose URSP allows a MA-PDU session for a default PDU session. Alternatively, the UE 200 may assign the priority to the first SIM 206a or the second SIM 206b, which has not been in the restricted service area. The UE 200 selects the prioritized first SIM 206a or second SIM 206b to the application for establishing the respective PDU session.

Figure 4B:
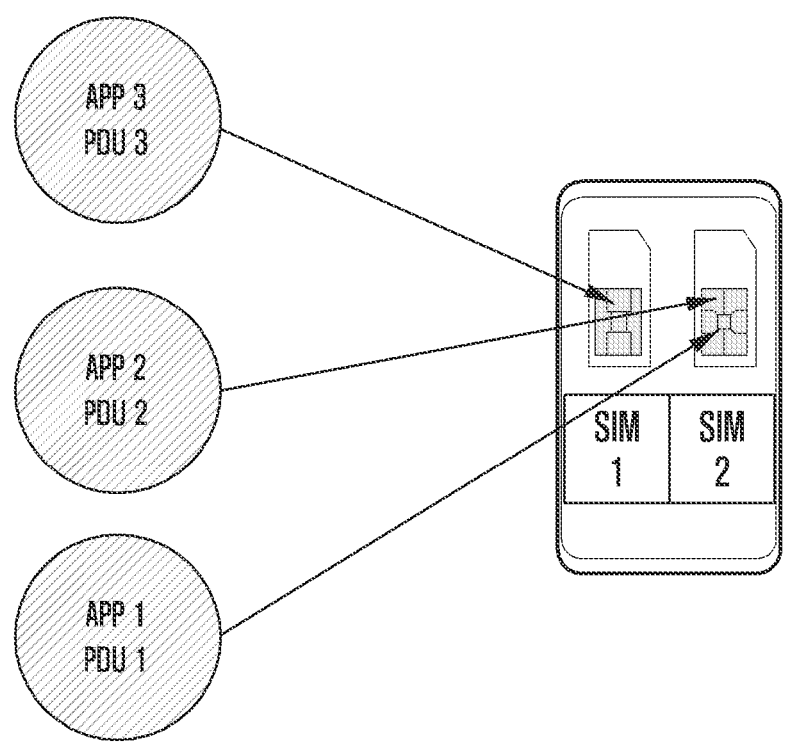

Consider an example scenario, referring to FIG. 4B, wherein applications 1-3 (an app 1, an app 2, and an app 3) triggers the data to establish the PDU session. In such a scenario, the UE 200 identifies the first SIM 206a for the app 3 and the second SIM 206b for the app 1, and the app 2, based on matching of the data of the app 1, the app 2, and the app 3 with the first URSP and the second URSP of the first SIM 206a, and the second SIM 206b, respectively. The UE 200 establishes a PDU session 1 (PDU 1), and a PDU session 2 (PDU 2) corresponding to the app 1, and the app 2 using the second SIM 206b. The UE 200 establishes a PDU session 3 (PDU 3) corresponding to the app 3 using the first SIM 206a.

Figure 4C:
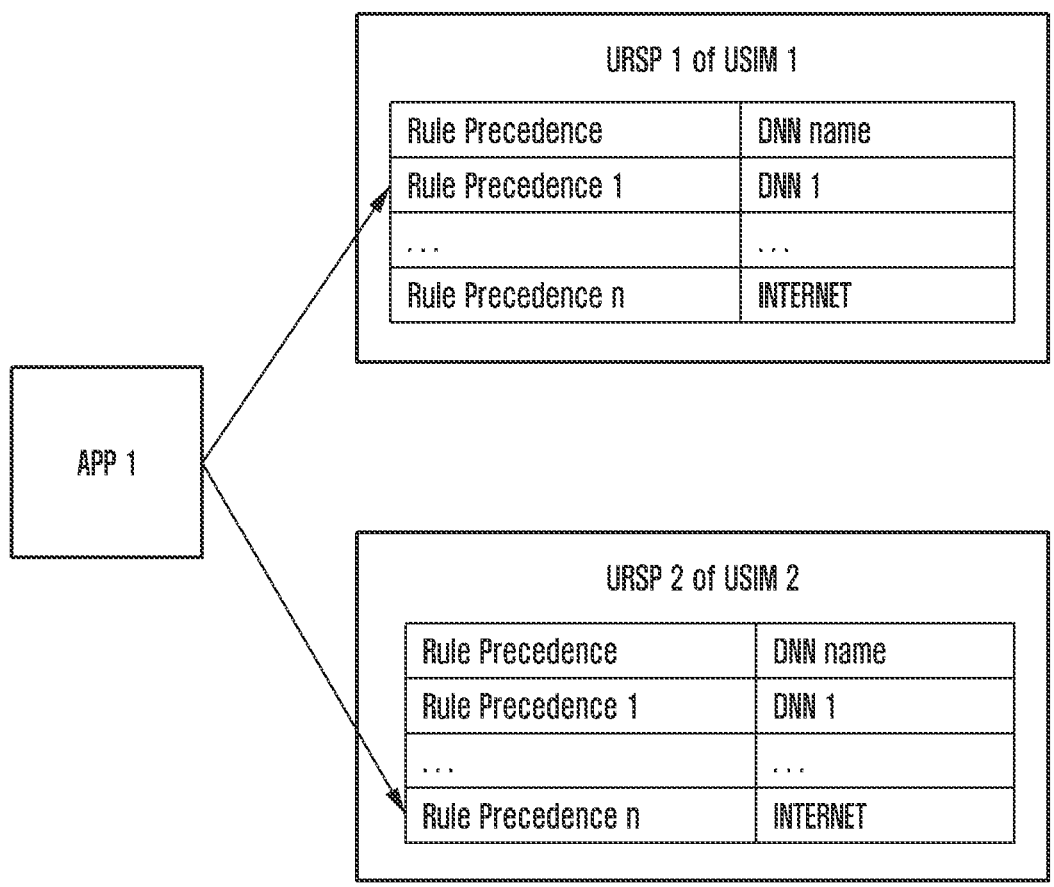

Referring to FIG. 4C, if a data of an application matches with a prioritized URSP rule (i.e., "Rule Precedence 1", as depicted in FIG. 4C) of a first SIM 206a and a default URSP rule of a second SIM 206b, an UE 200 assigns a priority to a first SIM 206a by determining that a first SIM 206a is in a non-restricted service area. The UE 200 identifies the prioritized first SIM 206a for the application to establish the PDU session. The UE 200 selects the first SIM 206a to establish the PDU session corresponding to the application.

Figure 4D:
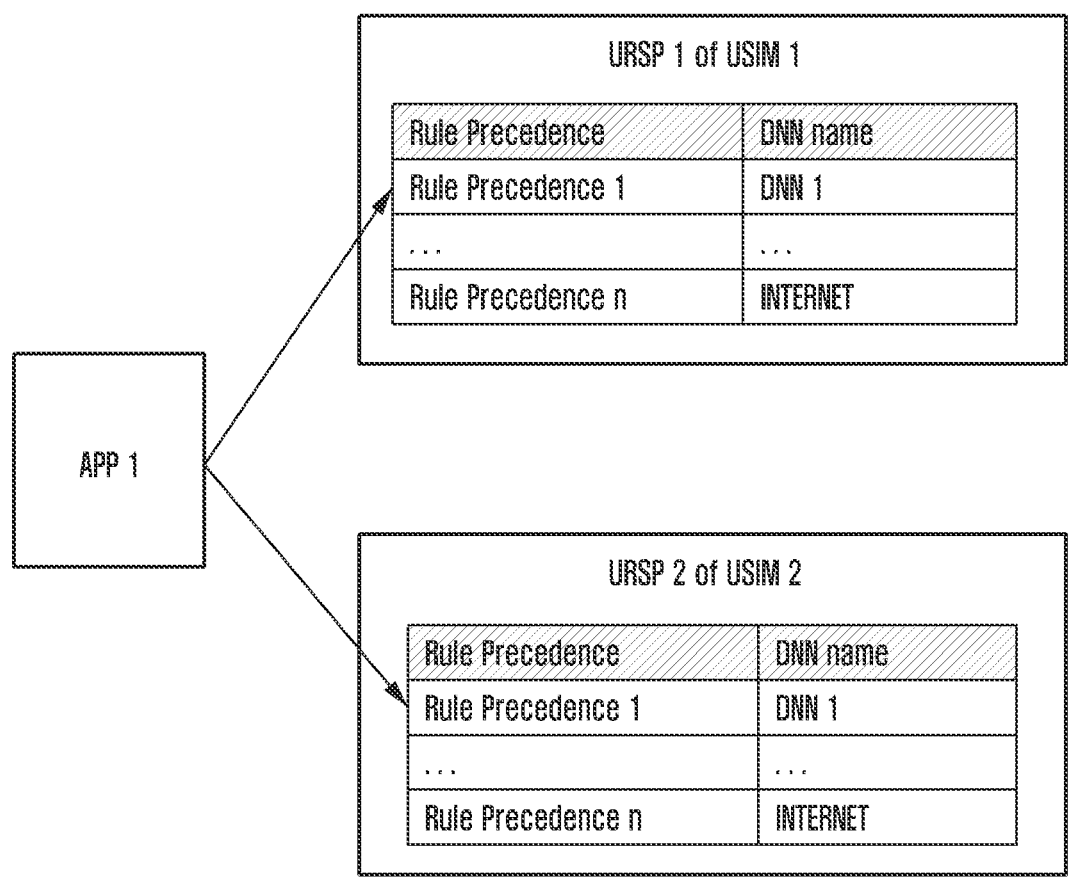

Referring to FIG. 4D, if a data of an application matches with prioritized URSP rules of both a first URSP and a second URSP associated with a first SIM 206a, and a second SIM 206b, respectively, an UE 200 identifies a first SIM 206a or a second SIM 206b for an application to establish a PDU session, based on other criteria such as, but are not limited to, a LADN DNN, a MA-PDU session, a PNI-NPN services, and so on.

Figure 5A:
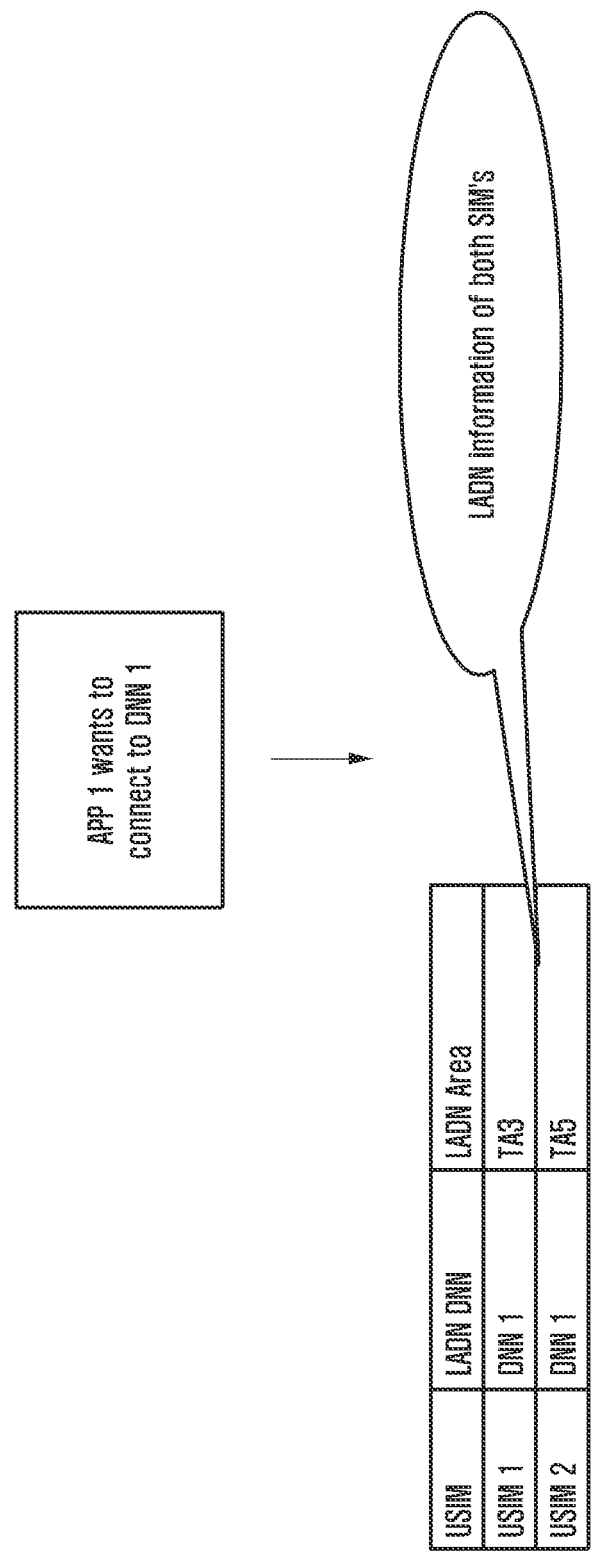
FIGS. 5A and 5B are example diagrams depicting identification of a first SIM or a second SIM for an application to establish a PDU session based on a Local Area Data Network (LADN) Data Network Name (DNN) in dual SIM scenarios, according to various embodiments of the disclosure.
Figure 5B:
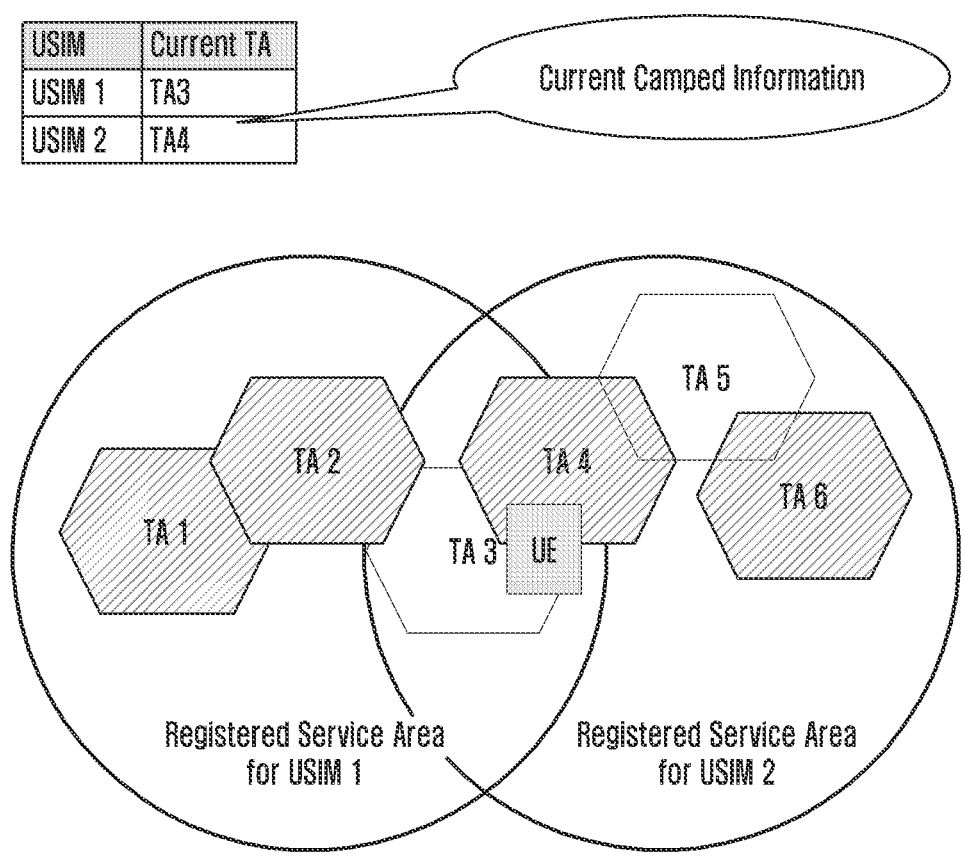

FIGS. 5A and 5B are example diagrams depicting identification of a first SIM or a second SIM for an application to establish a PDU session based on an LADN DNN in dual SIM scenarios, according to embodiments as disclosed herein.

In an embodiment, if the data of the application matches with the prioritized URSP rules of the first URSP and the second URSP associated with the first SIM 206a, and the second SIM 206b, respectively, the UE 200 identifies the first SIM 206a or the second SIM 206b for the application to establish the PDU session based on the LADN DNN. For identifying the SIM for the application, the UE 200 identifies the LADN DNN (for example herein, a DNN 1) with which the application requests to connect. On identifying the requested LADN DNN, the UE 200 identifies the first SIM 206a or the second SIM 206b associated with the LADN area supporting the requested LADN DNN for the application to establish the PDU session.

Consider an example scenario, referring to FIG. 5A, wherein an application requests to connect to a DNN 1 (an example of a LADN DNN), and a first SIM 206a and a second SIM 206b support a DNN 1 in a LADN area TA3, and TA5, respectively. In such a scenario, the UE 200 determines the current LADN area associated with the first SIM 206a and the second SIM 206b as a TA1, and a TA4, respectively, based on the current camping information referring to FIG. 5B. As the LADN area (i.e., the TA1) associated with the first SIM 206a supports the requested DNN 1, the UE 200 identifies the first SIM 206a for the application to establish the PDU session. Thus, any application which wants to connect to the DNN 1 may use the first SIM 206a to connect to LADN services and may obtain advantages of a Mobile Edge Computing (MEC).

Figure 6:
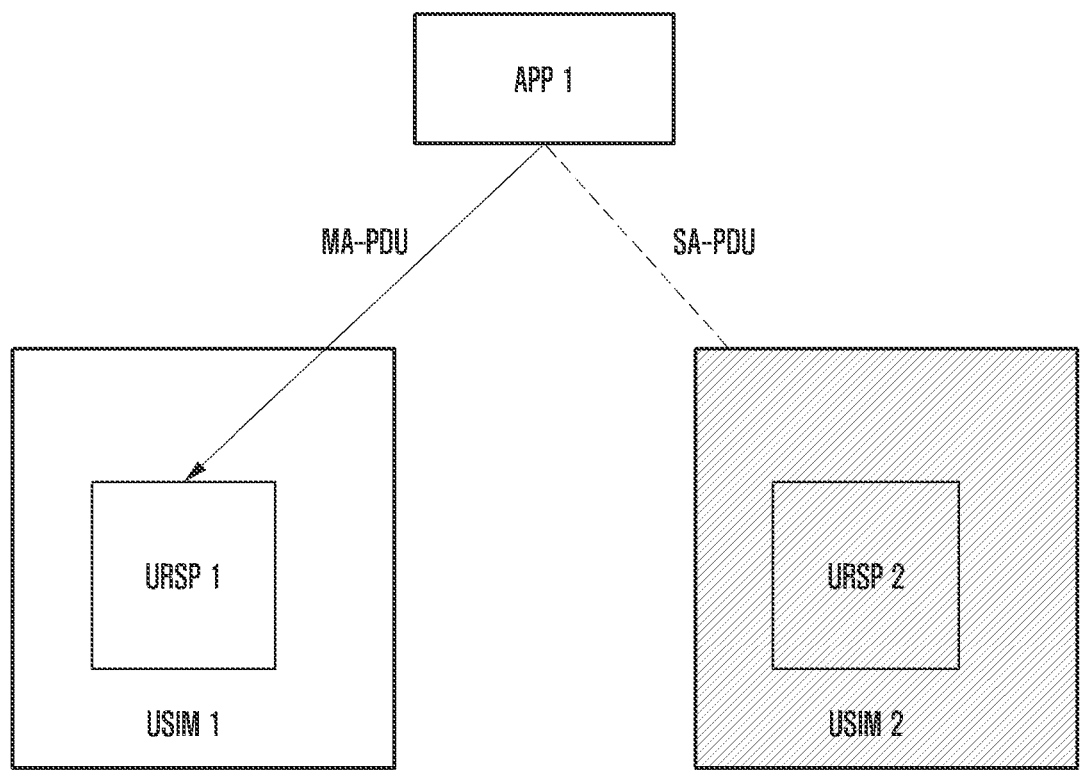
FIG. 6 is an example diagram depicting identification of a first SIM or a second SIM for an application based on a priority of a Multiple Access PDU (MA-PDU) session over a Standalone Access PDU (SA-PDU) session in dual SIM scenarios, according to an embodiment of the disclosure.

FIG. 6 is an example diagram depicting identification of a first SIM or a second SIM for an application based on a priority of an MA-PDU session over a SA-PDU session in dual SIM scenarios, according to an embodiment of the disclosure.

Referring to FIG. 6, in an embodiment, if data of an application matches with prioritized URSP rules of both a first URSP and a second URSP associated with a first SIM 206a, and a second SIM 206b, respectively, an UE 200 identifies a first SIM 206a or a second SIM 206b for an application to establish a PDU session based on a priority of a MA-PDU session over a SA-PDU session. Consider an example scenario, wherein the first SIM 206a supports the MA-PDU session over the SA-PDU session, and the second SIM 206b supports the SA-PDU session over the MA-PDU session. In such a scenario, the UE 200 identifies the first SIM 206a for the application to establish the PDU session.

Figure 7A:
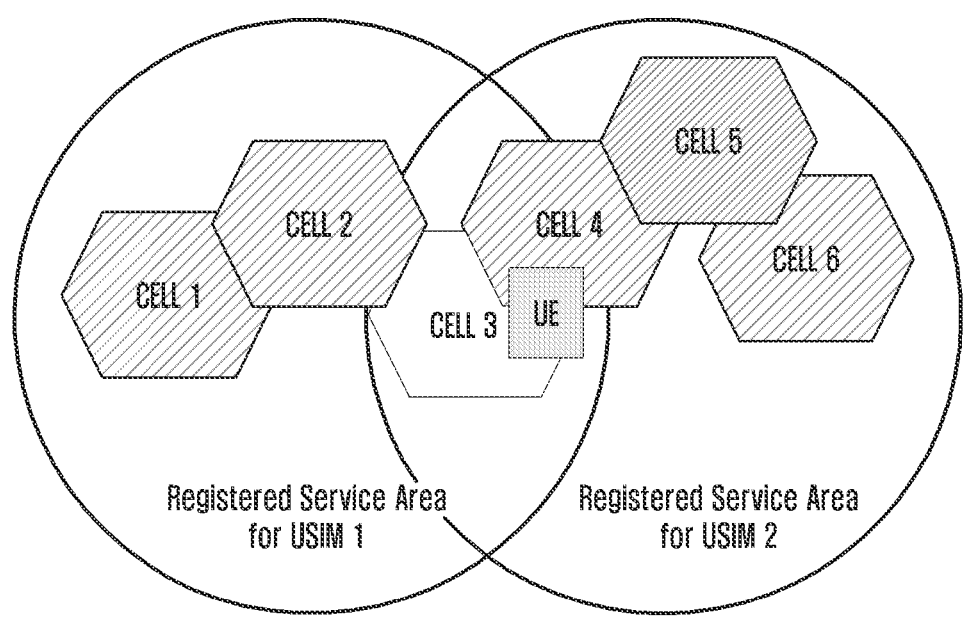
FIGS. 7A and 7B are example diagrams depicting identification of a first SIM or a second SIM for an application to establish PDU session based on prioritized Public Network Integrated Non-Public Network (PNI-NPN) services in dual SIM scenarios, according to various embodiments of the disclosure.
Figure 7B:
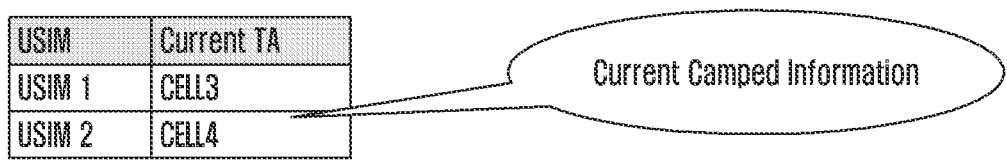

FIGS. 7A and 7B are example diagrams depicting identification of a first SIM 206a or a second SIM 206b for an application to establish a PDU session based on prioritized PNI-NPN services in dual DIM scenarios, according to various embodiments of the disclosure.

Referring to FIGS. 7A and 7B, in an embodiment, if data of an application matches with prioritized URSP rules of both a first URSP and a second URSP associated with a first SIM 206a, and a second SIM 206b, respectively, an UE 200 identifies a first SIM 206a or a second SIM 206b associated with a DNN supporting PNI-NPN services for an application to establish a PDU session.

Consider an example scenario, wherein the application triggers the data to establish the PDU session, and the data of the application matches with the prioritized URSP rule of both the first URSP and the second URSP associated with the first SIM 206a, and the second SIM 206b, respectively. In such a scenario, the UE 200 identifies the cells associated with the first SIM 206a and the second SIM 206b as, a cell 3, and a cell 4, respectively, based on the current camping information. The UE 200 then determines that the cell 3 associated with the first SIM 206a is the CAG cell and prioritizes the first SIM 206a over the second SIM 206b. The UE 200 then compares the DNNs/slices available in the non-CAG cell and the CAG cell to determine if the DNN associated with the first SIM 206a supports the PNI-NPN services. If the DNN associated with the first SIM 206a supports the PNI-NPN services, the UE 200 identifies the first SIM 206a for the application to establish the PDU session.

Consider another example scenario, wherein the UE 200 has already established the PDU sessions for the application using the second SIM 206b, which is in the non-CAG cell (i.e., the DNN associated with the second SIM 206b does not support the PNI-NPN services). In such a scenario, the UE 200 switches the PDU sessions (other than the IMS PDU sessions) from the second SIM 206b to the first SIM 206a, since the first SIM 206a is in the CAG cell and the DNN associated with the first SIM 206a supports the PNI-NPN services.

Figure 8A:
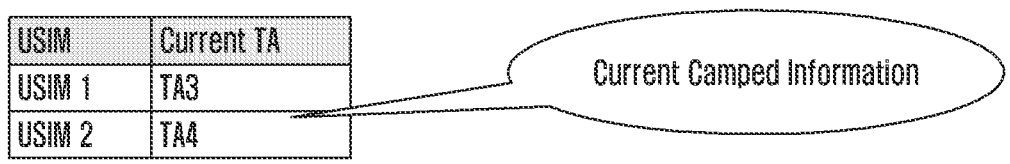
FIGS. 8A and 8B are example diagrams depicting switching of PDU sessions/outgoing services from one SIM to another, when one SIM has been stuck in a restricted service area and another SIM is in a non-restricted service area, according to various embodiments of the disclosure.
Figure 8B:
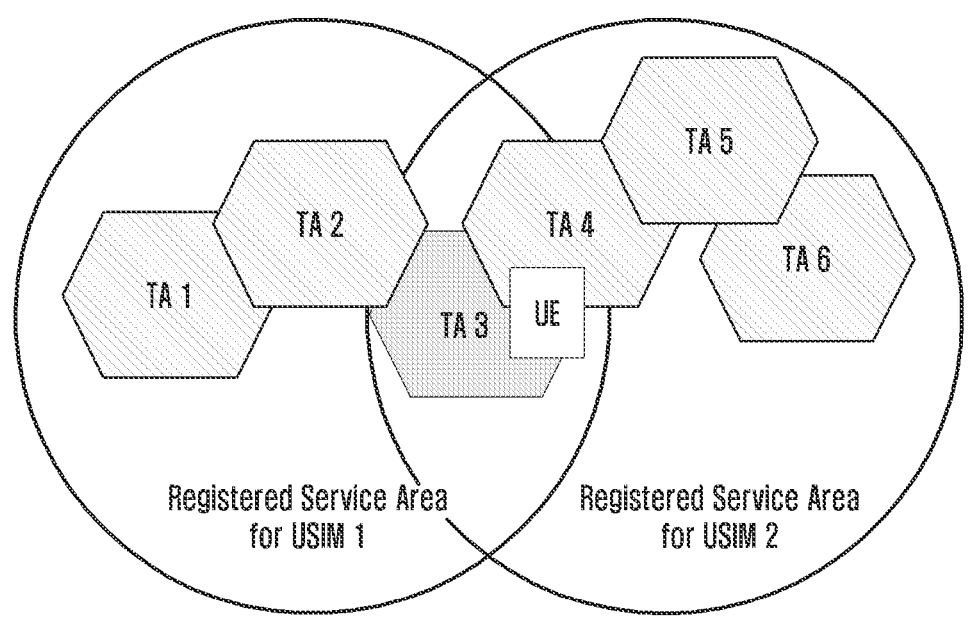

FIGS. 8A, and 8B are example diagrams depicting switching of PDU sessions/outgoing services from one SIM to another, when one SIM has been stuck in a restricted service area and another SIM is in a non-restricted service area, according to various embodiments of the disclosure.

In an embodiment, the UE 200 may switch the PDU sessions (except the IP IMS PDU session, the default PDU session, or the like) from the first SIM 206a to the second SIM 206b or from the second SIM 206b to the first SIM 206a, when the first SIM 206a or the second SIM 206b enters the restricted service area/non-allowed tracking area. The UE 200 further switches back the respective PDU sessions from the second SIM 206b to the first SIM 206a, or from the first SIM 206a to the second SIM 206b, when the first SIM 206a or the second SIM 206b exits the restricted service area/non-allowed tracking area.

Consider an example scenario, wherein the first SIM 206a is in a TA3 and the second SIM 206b is in a TA4, wherein the TA3 may be the restricted service area for the first SIM 206a, and the TA3, and the TA4 may be the non-restricted/registered service area for the second SIM 206b. As the TA3 is the restricted service area for the first SIM 206a, all the outgoing services expect emergency services may be blocked for the first SIM 206a. In such a scenario, the UE 200 switches the PDU session (for example, a PDU session 1) established using the first SIM 206a to the second SIM 206b. Once the first SIM 206a exits from the TA3 and enters the non-restricted/registered service area (i.e., a TA1, and a TA2, as depicted in FIG. 8B), the UE 200 switches the PDU session 1 from the second SIM 206b to the first SIM 206a.

Figure 9:
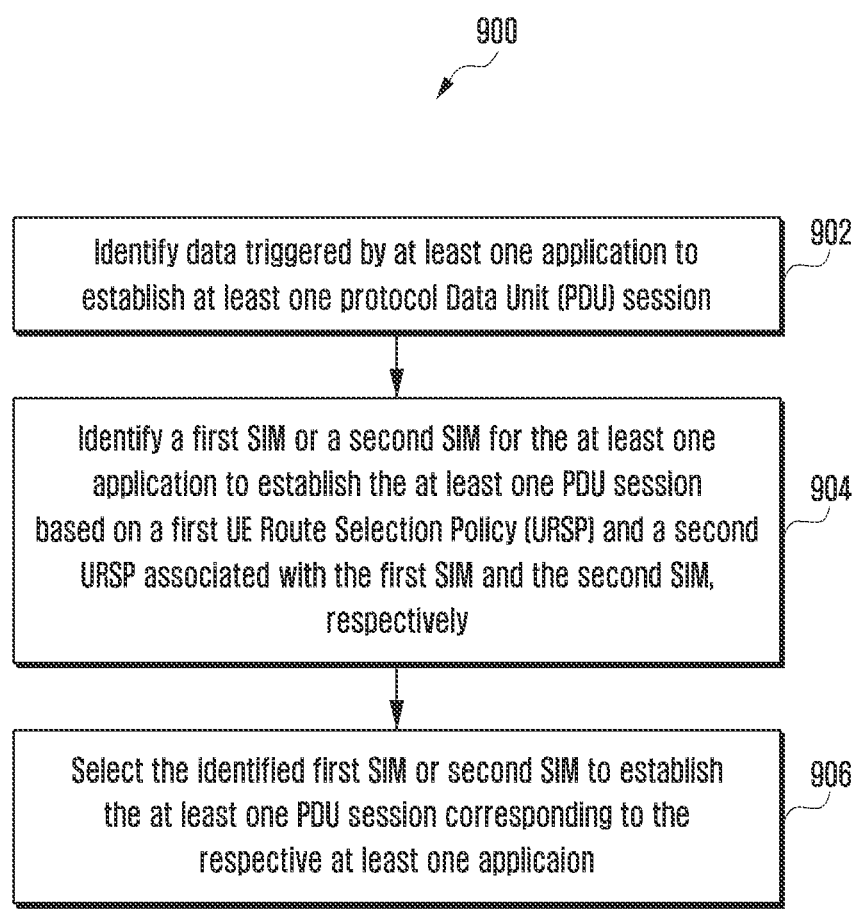
FIG. 9 is a flowchart depicting a method for performing SIM management on an UE, wherein a UE is one of, a Dual SIM Dual Standby (DSDS)/Dual SIM Dual Active (DSDA) UE, according to an embodiment of the disclosure.

FIG. 9 is a flowchart depicting a method for performing SIM management on an UE, wherein the UE is one of, a DSDS/DSDA UE, according to an embodiment of the disclosure.

Referring to FIG. 9 depicting method 900, at operation 902, the method includes identifying, by an UE 200, data triggered by at least one application to establish at least one PDU session.

At operation 904, the method includes identifying, by the UE 200, the first SIM 206a, or the second SIM 206b for the at least one application to establish the at least one PDU session based on the first URSP and the second URSP associated with the first SIM 206a and the second SIM 206b, respectively.

At operation 906, the method includes selecting, by the UE 200, the identified one of first SIM or second SIM to establish the at least one PDU session corresponding to the respective at least one application. The various actions in method 900 may be performed in the order presented, in a different order or simultaneously. Further, in some embodiments, some actions listed in FIG. 9 may be omitted.

Embodiments herein disclose methods and systems for providing an enhanced dual SIM experience by ensuring that the UE may always connects to a PDU session providing best service for a particular application irrespective of a SIM. Embodiments herein disclose methods and systems for enhancing the behavior of the UE and reducing data outage time to as minimum as possible.

The embodiments disclosed herein can be implemented through at least one software program running on at least one hardware device and performing network management functions to control the elements. The elements shown in FIGS. 2, and 3, can be at least one of a hardware device, or a combination of hardware device and software module.

The embodiments disclosed herein describe methods and systems for SIM management on a DSDS/DSDA device. Therefore, it is understood that the scope of the protection is extended to such a program and in addition to a computer readable means having a message therein, such computer readable storage means contain program code means for implementation of one or more operations of the method, when the program runs on a server or mobile device or any suitable programmable device. The method is implemented in a preferred embodiment through or together with a software program written in e.g., Very high speed integrated circuit Hardware Description Language (VHDL) another programming language or implemented by one or more VHDL or several software modules being executed on at least one hardware device. The hardware device may be any kind of portable device that may be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the disclosure may be implemented on different hardware devices, e.g., using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. While the disclosure has been shown and described with reference to various embodiments thereof, it will be understood by those skilled in the art that various changes in form and details may be made therein without departing from the spirit and scope of the disclosure as described by the appended claims and their equivalents.

What is claimed is:

1. A method for Subscriber Identity Module (SIM) management on a User Equipment (UE), the method comprising:
identifying, by the UE, data triggered by at least one application to establish at least one Protocol Data Unit (PDU) session;
identifying, by the UE, rules of a first UE Route Selection Policy (URSP) and a second URSP for the at least one application to establish the at least one PDU session based on the identified data;
identifying, by the UE, a first SIM associated with the identified first URSP and a second SIM associated with the identified second URSP, based on the identified rules; and
selecting, by the UE, the identified first SIM or the identified second SIM to establish the at least one PDU session corresponding to the respective at least one application,
wherein the selecting of the identified first SIM or the identified second SIM to establish the at least one PDU session, comprises:
selecting the first SIM or the second SIM that is associated with the URSP that allows a Multiple Access (MA)-PDU session if the data triggered by the at least one application corresponds to traffic descriptors of default URSP rules of both the first URSP and the second URSP.

2. The method of claim 1, wherein the UE is one of, a Dual SIM Dual Active (DSDA) UE, or a Dual SIM Dual Standby (DSDS) UE.

3. The method of claim 1,
wherein the first URSP and the second URSP further comprise prioritized URSP rules.

4. The method of claim 1,
wherein the data triggered by the at least one application comprises traffic descriptors, and at least one of application descriptors, Internet Protocol (IP) descriptors, or domain descriptors, and
wherein the prioritized URSP rules and the default URSP rules comprise traffic descriptors.

5. The method of claim 4, wherein the identifying of the first SIM and the second SIM for the at least one application to establish the at least one PDU session, in response to the traffic descriptors of the at least one application matching with the traffic descriptors of the default URSP rules of both the first URSP and the second URSP, comprises:
identifying the first SIM or the second SIM associated with the URSP that allows a Multiple Access (MA)-PDU session, for the at least one application to establish the at least one PDU session.

6. The method of claim 4, wherein the identifying of the first SIM and the second SIM for the at least one application to establish the at least one PDU session in response to the traffic descriptors of the at least one application matching with the traffic descriptors of the default URSP rules of both the first URSP and the second URSP, comprises:
checking if the first SIM or the second SIM is in the non-restricted service area; and
identifying the first SIM or the second SIM in the non-restricted service area for the at least one application to establish the at least one PDU session.

7. The method of claim 6, wherein the identifying of the first SIM and the second SIM for the at least one application to establish the at least one PDU session, in response to the traffic descriptors of the at least one application matching with the traffic descriptors of the prioritized URSP rule of the first URSP and the traffic descriptors of a default URSP rule of the second URSP, comprises:
checking if the first SIM is in the non-restricted service area; and
identifying the first SIM for the at least one application to establish the at least one PDU session, in response to the first SIM being in the non-restricted service area.

8. The method of claim 4, wherein the identifying of the first SIM and the second SIM for the at least one application to establish the at least one PDU session, in response to the traffic descriptors of the at least one application matching with the traffic descriptors of the prioritized URSP rules of both the first URSP and the second URSP, comprises:
identifying a Local Area Data Network (LADN) Data Network Name (DNN) requested by the application to connect;
determining a LADN area of the first SIM and the second SIM, based on camped information of the first SIM and the second SIM; and
identifying the first SIM or the second SIM present in the LADN area supporting the requested LADN DNN for the at least one application to establish the at least one PDU session.

9. The method of claim 5, wherein the identifying of the first SIM and the second SIM for the at least one application to establish the at least one PDU session, in response to the traffic descriptors of the at least one application matching with the traffic descriptors of the prioritized URSP rules of both the first URSP and the second URSP, comprises:
checking if the first SIM or the second SIM supports the MA PDU session over a Standalone (SA)-PDU session; and
identifying the first SIM or the second SIM supporting the MA PDU session over the SA-PDU session for the at least one application to establish the at least one PDU session.

10. The method of claim 4, wherein the identifying of the first SIM and the second SIM for the at least one application to establish the at least one PDU session, in response to the traffic descriptors of the at least one application matching with the traffic descriptors of the prioritized URSP rules of both the first URSP and the second URSP, comprises:
determining if the first SIM or the second SIM is present in a Closed Access Group (CAG) cell;
checking if one of DNNs associated with the first SIM or the second SIM present in the CAG cell supports Public Network Integrated Non-Public Network (PNI-NPN) services by comparing the DNNs available in a non-CAG cell and the CAG cell; and
selecting the first SIM or the second SIM present in the CAG cell with the DNN supporting the PNI-NPN services for the at least one application to establish the at least one PDU session.

11. The method of claim 10, further comprising:
switching the at least one PDU session from the first SIM to the second SIM, in response to the second SIM being associated with the DNN supporting the PNI-NPN services or vice-versa.

12. The method of claim 1, further comprising:
switching, by the UE, the at least one PDU session from the second SIM to the first SIM or from the first SIM to the second SIM, if the second SIM or the first SIM is in a restricted service area, respectively, wherein the at least one PDU session comprises a PDU session other than an Internet Protocol (IP) Multimedia Subsystem (IMS) PDU session and a default PDU session; and
switching back, by the UE, the respective at least one PDU session to the second SIM from the first SIM or to the first SIM from the second SIM, in response to the second SIM or the first SIM exiting from the restricted service area.

13. A User Equipment (UE) comprising:
a first Subscriber Identity Module (SIM);
a second SIM;
a processing circuitry coupled to the first SIM and the second SIM; and
memory storing one or more computer programs including computer-executable instructions that, when executed by the processing circuitry, cause the UE to:
identify data triggered by at least one application to establish at least one Protocol Data Unit (PDU) session,
identify a first UE Route Selection Policy (URSP) and a second URSP for the at least one application to establish the at least one PDU session based on the identified data,
identify a first SIM associated with the identified first URSP and a second SIM associated with the identified second URSP, based on the identified rules, and
select the identified first SIM or second SIM to establish the at least one PDU session corresponding to the respective at least one application, wherein the one or more computer programs further include computer-executable instructions that, when executed by the processing circuitry, cause the UE to select the first SIM or the second SIM associated with the URSP that allows a Multiple Access (MA)-PDU session if the data triggered by the at least one application corresponds to traffic descriptors of default URSP rules of both the first URSP and the second URSP.

14. The UE of claim 13,
wherein the first URSP and the second URSP further comprises prioritized URSP rules.

15. The UE of claim 14, wherein the one or more computer programs further include computer-executable instructions that, when executed by the processing circuitry, cause the UE to, if traffic descriptors of the at least one application match with the traffic descriptors of the default URSP rules of both the first URSP and the second URSP,
identify the first SIM or the second SIM associated with the URSP that allows a Multiple Access (MA)-PDU session, for the at least one application to establish the at least one PDU session.

16. The UE of claim 14,
wherein the one or more computer programs further include computer-executable instructions that, when executed by the processing circuitry, cause the UE to, in response to the traffic descriptors of the at least one application matching with the traffic descriptors of the default URSP rules of both the first URSP and the second URSP:
check if the first SIM or the second SIM is in a non-restricted service area, and
identify the first SIM or the second SIM in the non-restricted service area for the at least one application to establish the at least one PDU session, and
wherein the one or more computer programs further include computer-executable instructions that, when executed by the processing circuitry, cause the UE to, in response to the traffic descriptors of the at least one application matching with traffic descriptors of the prioritized URSP rules of the first URSP and traffic descriptors of a default URSP rule of the second URSP:
check if the first SIM is in the non-restricted service area, and
identify the first SIM for the at least one application to establish the at least one PDU session, in response to the first SIM being in the non-restricted service area.

17. The UE of claim 14, wherein the one or more computer programs further include computer-executable instructions that, when executed by the processing circuitry, cause the UE to, in response to the traffic descriptors of the at least one application matching with traffic descriptors of the prioritized URSP rules of both the first URSP and the second URSP:
identify a Local Area Data Network (LADN) Data Network Name (DNN) requested by the application to connect,
determine a LADN area of the first SIM and the second SIM, based on camped information of the first SIM and the second SIM, and
identify the first SIM or the second SIM present in the LADN area supporting the requested LADN DNN for the at least one application to establish the at least one PDU session.

18. The UE of claim 15, wherein the one or more computer programs further include computer-executable instructions that, when executed by the processing circuitry, cause the UE to, in response to the traffic descriptors of the at least one application matching with traffic descriptors of the prioritized URSP rules of both the first URSP and the second URSP:
check if the first SIM or the second SIM supports the MA PDU session over a Standalone (SA)-PDU session, and
identify the first SIM or the second SIM supporting the MA PDU session over the SA-PDU session for the at least one application to establish the at least one PDU session.

19. The UE of claim 14, wherein the one or more computer programs further include computer-executable instructions that, when executed by the processing circuitry, cause the UE to, in response to the traffic descriptors of the at least one application matching with traffic descriptors of the prioritized URSP rules of both the first URSP and the second URSP:
determine if the first SIM or the second SIM is present in a Closed Access Group (CAG) cell,
check if one of DNNs associated with the first SIM or the second SIM present in the CAG cell supports Public Network Integrated Non-Public Network (PNI-NPN) services by comparing the DNNs available in a non-CAG cell and the CAG cell, and
select the first SIM or the second SIM present in the CAG cell with the DNN supporting the PNI-NPN services for the at least one application to establish the at least one PDU session.

20. The UE of claim 13, wherein the one or more computer programs further include computer-executable instructions that, when executed by the processing circuitry, cause the UE to:
switch the at least one PDU session from the second SIM to the first SIM or from the first SIM to the second SIM, in response to the second SIM or the first SIM being in a restricted service area, respectively, wherein the at least one PDU session comprises a PDU session other than an Internet Protocol (IP) Multimedia Subsystem (IMS) PDU session and a default PDU session, and
switch back the respective at least one PDU session to the second SIM from the first SIM or to the first SIM from the second SIM, in response to the second SIM or the first SIM exiting from the restricted service area.

* * * * *